United States Patent [19]

Hoffman

[11] Patent Number: 4,531,083
[45] Date of Patent: Jul. 23, 1985

[54] CURRENT REGULATING CIRCUIT

[75] Inventor: Philip A. Hoffman, Towson, Md.

[73] Assignee: Solid State Chargers Research and Development Limited Partnership, Lutherville, Md.

[21] Appl. No.: 524,357

[22] Filed: Aug. 18, 1983

Related U.S. Application Data

[63] Continuation-in-part of Ser. No. 472,758, Mar. 7, 1983, Pat. No. 4,504,774.

[51] Int. Cl.³ .................................... H01M 10/44
[52] U.S. Cl. ............................... 320/9; 320/35; 320/39; 320/53; 323/278
[58] Field of Search ............ 320/2, 9, 35, 39, 53, 320/57, 59, DIG. 1; 323/223, 265, 273, 278, 303, 311, 282

[56] References Cited

U.S. PATENT DOCUMENTS 3,582,713  6/1971  Till ........................... 323/278
3,889,171  6/1975  Hunter, Jr. ................. 320/35
3,943,423  3/1976  Hoffman .................... 320/22

OTHER PUBLICATIONS

Rehak, Peter H., "Micropower Voltage Regulator with Very Low $V_{out}-V_{in}$", Jun. 1980, *Electronic Engineering*, vol. 52, No. 639, p. 19.

*Primary Examiner*—Peter S. Wong
*Assistant Examiner*—Anita M. Ault
*Attorney, Agent, or Firm*—Leonard Bloom

[57] ABSTRACT

A battery charger which includes terminals for connection to an electric power source, an electrical charging circuit and an operative arrangement for connecting at least one rechargeable battery cell in series with the charging circuit across the terminals. The battery charger has a charging circuit which includes a first resistor, a second resistor, a third resistor and a rectifier, constituted by at least one diode, in series. A first transistor, which has a collector-emitter path and a base-emitter path, is operatively connected so that the base-emitter path is connected in parallel with the first resistor. A fourth resistor is provided, the fourth resistor being connected in series with the collector-emitter path of the transistor and the third resistor. In one species, a plurality of additional transistors, connected in Darlington configuration, includes a second transistor and a final transistor, each of the additional transistors having its collector connected to a circuit point between the third resistor and an electrode of the diode. The first transistor and the last transistor in the one species have their emitters connected via a current-limiting PTC fifth resistor which may act as a fuse. The first transistor and the second transistor have their respective collector and base conductively connected. In another species, a field effect transistor, preferably a MOSFET, is used instead of the Darlington configuration. The connection of the third resistor provides internal feedback. The fifth resistor, when in series with the first resistor in the base-emitter circuit, provides external feedback.

21 Claims, 8 Drawing Figures

CURRENT REGULATING CIRCUIT

CROSS REFERENCE TO RELATED APPLICATIONS

This application is a continuation-in-part of patent application Ser. No. 472,758 of Philip A. Hoffman filed on Mar. 7, 1983, now U.S. Pat. No. 4,504,774 and entitled "Current Regulating Circuit", and which is incorporated herein in its entirety by reference.

FIELD OF THE INVENTION

The present invention relates to a current regulating circuit especially adaptable for integrated circuit manufacture, and more particularly, to a battery charging circuit that may be fabricated as a relatively-small solid state component and incorporated directly in a cordless tool or appliance, thereby obviating the use of a cumbersome, bulky and expensive external charger utilizing a conventional transformer.

BACKGROUND OF THE INVENTION

While not restricted thereto, this invention finds immediate application in simple, inexpensive battery charging circuits which are especially useful for charging batteries used in portable battery-operated devices such as soldering pencils, shavers, cordless telephones, calculators, computers, television sets, radios, recorders, electric garden tools, cordless hand tools including woodworking and metalworking tools, and the like. More particularly, the present invention finds direct application in battery charging circuits for cordless devices which are simple, inexpensive to make and may be readily incorporated directly into the cordless devices.

Battery-operated cordless devices, such as hand tools, have a considerable popularity because of the convenience afforded by these devices. Devices of this type are customarily provided with a small D.C. electric drive motor which is energized by one or more rechargeable batteries incorporated within the tool housing and operatively associated with the electric drive motor. When the device is a television set, radio, recorder or the like, the rechargeable batteries supply D.C. power to the circuits therein either exclusively or alternatively, in instances in which an A.C. power cord and plug are provided. The elimination of a conventional electric cord or its alternative use increases the freedom with which the user of the cordless device can move about, eliminating the inconveniences of clearing the power cord from obstacles with which it may otherwise become entangled and reducing the necessity of having electric wall outlets available at every place the device is to be used. It has become customary to provide cordless devices, such as cordless garden tools and woodworking tools with rechargeable batteries so as to avoid the necessity of frequent battery replacements, and to reduce the cost of operation. The present day rechargeable batteries, properly maintained with a special charge, have an extended life and greatly enhanced convenience with which the cordless device may be operated.

Most cordless devices, such as cordless hand tools and the like, operate from a D.C. battery potential of only a few volts. The prior art has resorted to recharging the batteries from a conventional 117 volt, 60 Hz electrical outlet through voltage stepped-down transformers which necessarily are of considerable size and consequently increase the size, cost and weight of the battery charger. Different outlet voltage levels and/or supply frequencies are also encountered. The size and weight of the battery charger, and particularly the contribution to the weight by the step-down transformer, has made it difficult to incorporate a charging circuit directly into cordless devices and to make such a charger inexpensively. Moreover, the handling, storage and packaging of battery chargers involving transformers result in serious shortcomings and limitation on their use, particularly if desired to be incorporated in the cordless device itself. Moreover, the customer and user of a variety of cordless tools, appliances or devices will accumulate an equal variety of separable chargers, and some confusion may result in determining which charger is to be used with a particular cordless device.

It is known from U.S. Pat. No. 3,943,423 to Philip A. Hoffman entitled "Battery Charging Circuit" and issued on Mar. 9, 1976 to provide a battery charging circuit which eliminates the need for a relatively bulky and heavy voltage step-down transformer, and which, when recharging batteries in a hand tool or the like, needs simply to be connected to a conventional, 117 volt 60 Hz household outlet and to the battery cell or cells which are to be recharged. Here again, other outlet voltage levels and/or supply frequencies can be used as well. The known charging circuit of the aforesaid Hoffman patent comprises a variable resistance switch preferably realized in the form of a PNP junction transistor and Darlington-connected other transistors operatively associated with a feedback circuit. This known circuit has, in addition to the transistors and resistors, two rectifying diodes and two capacitors, resulting in a circuit which, particularly because of the need for the capacitors and a considerable number of passive components, becomes relatively more expensive to realize as an integrated circuit than the present invention and would be somewhat bulky and more expensive to miniaturize than the present invention using other techniques for incorporation into cordless devices.

It is known from the further U.S. Pat. No. 3,970,912 issued on July 20, 1976 to Philip A. Hoffman and entitled "Battery Charging Circuit" to provide a battery charging circuit free of transformers and operatively arranged to produce current pulses which are supplied to the battery or batteries to be recharged via the inductance of an electric motor, which forms part of a cordless hand tool or the like. This circuit, while not requiring capacitors, does require at least two diodes and an inductance, albeit the inductance of an electric motor which is a portion of a powered hand tool or the like. As a result, this circuit has somewhat limited utility because of the requirement for an inductance, and, in particular, the inductance provided by a D.C. electric motor.

A considerable number of battery chargers have been proposed and are known from the general prior art including U.S. Letters Patents identified as follows:

| Numbers | Patentees | Issue Date |
| --- | --- | --- |
| 3,281,639 | Norman N. Potter et al. | October 25, 1966 |
| 3,735,233 | Richard B. Ringle | May 22, 1973 |
| 3,876,921 | John H. Bigbee, III | April 8, 1975 |
| 4,013,934 | George J. Frye | March 22, 1977 |
| 4,140,958 | Charles R. Groeschel | February 20, 1979 |
| 4,158,813 | Robert W. Ellis et al. | June 19, 1979 |
| 4,162,439 | Arthur Schneider | July 24, 1979 |
| 4,186,335 | Harold J. Cahill | January 29, 1980 |

| Numbers | Patentees | Issue Date |
|---|---|---|
| 4,220,905 | William T. Quarton | September 2, 1980 |
| 4,266,178 | Tatsushi Asakawa | May 5, 1981 |
| 4,292,578 | Robert L. Steigerwald et al. | September 29, 1981 |
| 4,321,523 | Ronald O. Hammel | March 23, 1982 |
| 4,348,619 | Ray et al. | September 7, 1982. |

It is also known from Mims III "Engineer's Notebook A Handbook of Integrated Circuit Applications", First Edition, Second Printing, pg. 95, Radio Shack, A division of the Tandy Corporation, U.S.A. (1979) to use integrated circuits in battery chargers.

SUMMARY OF THE INVENTION

An object of the present invention is to provide an improved current regulating circuit for recharging small batteries, which is free of all transformers, smoothing capacitors and inductors.

Another object of the present invention is to provide a current regulating circuit which is simple, inexpensive and can readily be realized as an integrated circuit.

An additional object of the present invention is to provide a current regulating circuit which is simple, inexpensive, small and lightweight and which can be incorporated directly into a cordless, battery-operated device.

A further object of the present invention is to provide a simple, inexpensive battery charger which can be operated from a conventional 117 volt, 60 $H_z$, or 234 volt A.C., 60 $H_z$, power sources and which can be operated as well from power sources having different voltages and frequencies.

Yet another object is to provide a battery charger which utilizes the instant current regulating circuit and achieves the respective objects set out above.

The foregoing objects, as well as others which are to become apparent from the text below, can be achieved in accordance with the present invention by providing an improvement in a battery charger including terminals for connection to an electric power source and further including an electrical charging circuit and operative arrangements for connecting at least one rechargeable battery cell in series with the charging circuit across the terminals. In particular, the battery charger is constituted by a charging circuit which consists of a first resistance (defined substantially by two resistors considered to be in parallel), a second resistance (resistor) and a third resistance (resistor) in series in the denominated order and a rectifier, constituted by at least one diode for developing a D.C. voltage. A first transistor, which has a collector-emitter path and a base-emitter path, is operatively connected so that the base-emitter path is connected in parallel with the first resistance. A fourth resistance (resistor) is provided, the fourth resistance being connected in series with the collector-emitter path of the transistor and the third resistance. A plurality of additional transistors, connected in a Darlington configuration or array, includes a second transistor and a final transistor, each of the additional transistors having its collector connected to a circuit point between the third resistance and an electrode of the diode. The first transistor and the last transistor have their emitters connected via a fifth resistance (resistor), and the first transistor and the second transistor have their respective collector and base conductively connected, the fifth resistance (which has one end connected to the emitter of the first transistor) (has its other end connected to that end of the first resistance which is not connected to the base of the first transistor via one of the resistors which define the first resistance. The fifth resistance (which is connected to the emitter of the last transistor) is also connected to the end of the one resistor forming part of the first resistance (which is not connected to the base of the first transistor) for the purpose of providing external feedback.

In one aspect, the present invention is a current regulating circuit having rectification means for producing a D.C. voltage and amplicifaction means, and a feedback control circuit. The feedback control circuit includes a solid state means having first, second and third terminals, the third comprising a control terminal. The control circuit further includes a current sensing resistor, and first, second and third resistors. The first resistor has one end thereof connected to the first terminal and the other end thereof connected to the third control terminal of the solid state means. The second resistor has one end thereof connected to the third control terminal, and the third resistor has one end thereof connected to receive the D.C. voltage. The other end of the second resistor is connected the the other end of the third resistor.

In another aspect, the present invention is a current regulating circuit adapted for integrated circuit manufacture and having rectification means, amplification means, and a feedback control circuit. The feedback control circuit includes solid state means having first, second and third terminals, the third comprising a control terminal. A current sensing resistance is connected between the amplification means and the control circuit. A first resistor has one end thereof connected to the first terminal and the other end thereof connected to the third control terminal of the solid state means. A second resistor has one end thereof connected to the control terminal. A third resistor has one end thereof connected to receive the D.C. voltage, and the other end thereof connected to the other end of the second resistor. A fourth resistor has one end thereof connected to the other end of the third resistor, and the other end thereof connected to the second terminal of the solid state means. With this arrangement, the individual resistance values of the four resistors can vary substantially and are not nearly as important as the ratios between the first, second and third resistors to the fourth resistor, respectively. The current-sensing resistance may be constituted by a fifth resistor is connected between the current amplification means and the control circuit. This fifth resistor has a positive temperature coefficient resistance which increases in value as the temperature increases, thereby limiting the current flow to the load. Moreover, this fifth resistor is formed by a metallization technique during the integrated circuit manufacture and has a relatively small resistance compared to the other resistors, the fifth resistor serving as a fuse for fail safe operation of the circuit.

In an additional aspect, the invention constitutes an improvement in a battery charger comprising terminal means for connection to an electric power source, an electrical charging circuit, and means for connecting at least one rechargeable battery in series with said charging circuit across said terminal means. The improved charging circuit includes a first resistance, a second resistance and a third resistance, connected in series in this denominated order, and rectifying means including a diode for developing D.C. voltage. A first transistor has a collector-emitter path and a base-emitter path, the base-emitter path being connected in parallel with said first resistance. A fourth resistance is connected in series with the collector-emitter path and a circuit point between the second resistance and the third resistance. A fifth resistance is provided. A field effect transistor, preferably a MOSFET, is connected in series with the fifth resistance. The first transistor and the field effect transistor have their respective collector and gate electrodes conductively connected, and the field effect transistor has its source electrode coupled to a circuit point between the third resistance and the drain electrode is connected to the fifth resistance.

The present invention can be considered to be in a control circuit for a battery charger, the combination of a first resistance which is defined substantially by two resistors connected in parallel, a second resistance, and a third resistance connected in series with each other, a transistor having a collector, emitter and base, the base being connected to the junction of the first and second resistances, the emitter being connected to the other end of the first resistance, and a fourth resistor having one end thereof connected to the junction of the second and third resistances and the other end thereof connected to the collector of the transistor. The individual values of the first, second, third and fourth resistances can vary substantially without affecting the performance of the control circuit, and wherein the exact values of said resistors are substantially less important than the ratios therebetween. A fifth resistance is provided, one of the two resistors defining the first resistance being connected in series with the fifth resistance, while the other of thewe two resistors is connected in parallel with the series arrangement.

In another important aspect, the invention can be considered, in a battery charger manufactured as an integrated circuit, the combination of a control circuit, a amplifier circuit constituted by a field effect transistor, preferably a MOSFET, and a current sensing resistor therebetween, the current sensing resistor having a relatively low value and preferably being formed by metallization techniques during the integrated circuit manufacture.

Further, the invention can also be considered, in a battery charger intended for integrated circuit manufacture and comprising terminal means for connection to an electric power source, an electrical charging circuit, and means for connecting at least one rechargeable battery in series with said charging circuit across said terminal means, the improvement wherein the charging circuit includes a first resistance, a second resistance and a third resistance connected in series in denominated order, and rectifying means including at least one diode for producing D.C. voltage. A first transistor has a collector-emitter path and a base-emitter path, the base-emitter path being connected in parallel with said first resistance. A fourth resistance is connected in series with the collector-emitter path and a circuit point between the second resistance and the third resistance. A fifth resistance is provided as is a field effect transistor. The first transistor and the field effect transistor have their respective collector and gate electrodes conductively connected. The field effect transistor has its source electrode coupled to the D.C. voltage and its drain electrode connected to one end of the fifth resistance. The field effect transistor is preferably a MOSFET.

The respective individual values of the first, second, third and fourth resistances can vary substantially and are not nearly as important as the ratios between the first, second and third resistances to the fourth resistance, respectively, and wherein the fifth resistance is very small compared to said other resistances and is formed by a metallization technique during the integrated circuit manufacture.

The invention can be seen in a battery charger intended for integrated circuit manufacture as including terminal means for connection to the electric power source, an electrical charging circuit and means for connecting at least one rechargeable battery in series with said charging circuit across said terminal means. The charging circuit comprising a first resistance (defined substantially by a given resistance and another resistance considered in parallel, a second resistance and a third resistance connected in series in the denominated order. Rectifying means, including at least one diode for producing D.C. voltage is provided. A first transistor has a collector-emitter path and a base-emitter path, the base-emitter path being connected in parallel with the given resistance. A fourth resistance is provided, the fourth resistance being connected in series with the collector-emitter path and a circuit point between said second resistance and said third resistance. A plurality of additional transistors connected in a Darlington configuration is provided, this configuration including a second transistor and a final transistor. The first transistor and the second transistor having their respective collector and base conductively connected, and each of said additional transistors has its collector coupled to a circuit point to receive the D.C. voltage. A fifth resistance is provided, the first transistor and the last transistor having their emitters connected via the fifth resistance, said another resistance and the fifth resistance being connected in series with one another, this series combination being connected in parallel with the base-emitter path, the respective individual values of the first, second, third and fourth resistances can vary substantially and are not nearly as important as the ratios between said first, second and third resistances to said fourth resistance, respectively, and wherein said fifth resistance is very small compared to said other resistances.

The invention can also be viewed, in a battery charger having terminal means for connection to an electric power source, an electrical charging circuit, and means for connecting at least one rechargeable battery in series with said charging circuit across said terminal means, the improvement wherein the charging circuit includes a first resistance, a second resistance and a third resistance connected in series in denominated order. Rectifying means including at least one diode is provided for developing D.C. voltage. A control transistor has a collector-emitter path and a base-emitter path. The base-emitter path is connected in parallel with the first resistance. A fourth resistance is connected in series with the collector-emitter path and a circuit point between the second resistance and the third resistance. Means are further provided, having a control electrode and controllable charging current carrying electrodes. The charging current carrying electrodes are connected in series with the diode. The control transistor has its collector coupled to the control electrode. A fifth resistance is provided, the emitter of the control transistor and one of the current carrying electrodes are connected via the fifth resistance.

BRIEF DESCRIPTION OF THE DRAWINGS

FIG. 2A is a circuit diagram of a first embodiment of a current regulating circuit according to the present invention used in a battery charger and which may be incorporated into the housing of the hand tool illustrated in FIG. 1 and the like.

DETAILED DESCRIPTION OF THE PREFERRED EMBODIMENT

Figure 1:
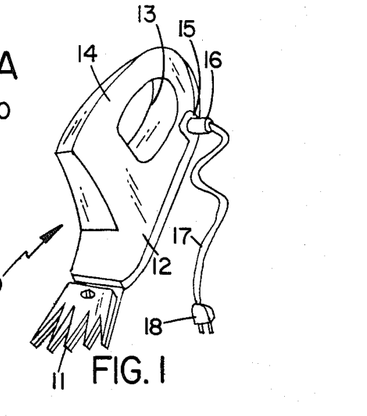
FIG. 1 is a perspective view of a hand tool in the form of a battery-operated grass clipper or pruning shears into which a battery charger, constructed in accordance with the present invention, may be placed.

Referring to the drawings, FIG. 1 shows a cordless, battery-operated hand tool in the form of a grass clippers 10 for the purpose of illustration. The grass clippers 10 includes shearing blades 11 supported from a housing 12 which is apertured at 13 to provide an integral handle portion 14. Within the housing 12 is an electric motor (not visible) connected to drive the blades 11 and a power supply battery or batteries (not visible) in FIG. 1 for energizing the motor.

On one side of the housing 12 is a socket 15 which acts as a receptacle for a power supply plug 16 connected to one end of the power supply cord 17. The other end of the power supply cord 17 terminates a conventional dual-prong plug 18 which is to be inserted into a conventional, 117 volt, 60 Hz household power outlet. During operation, the plug 16 is removed from the socket 15; however, when the battery or batteries are to be recharged, the cord 17 is connected to the household outlet and the plug 16 is inserted into the socket 15 to recharge the battery or batteries. When charging is completed, the plug 16 is removed.

Figure 2A:
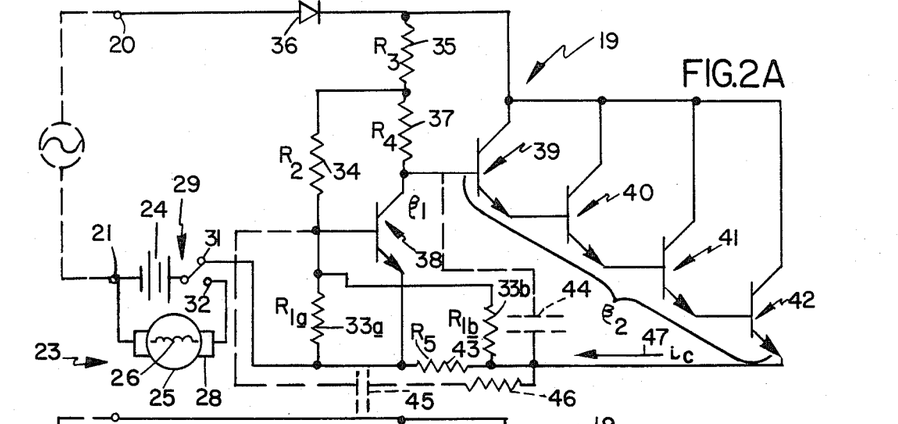
Figure 2B:
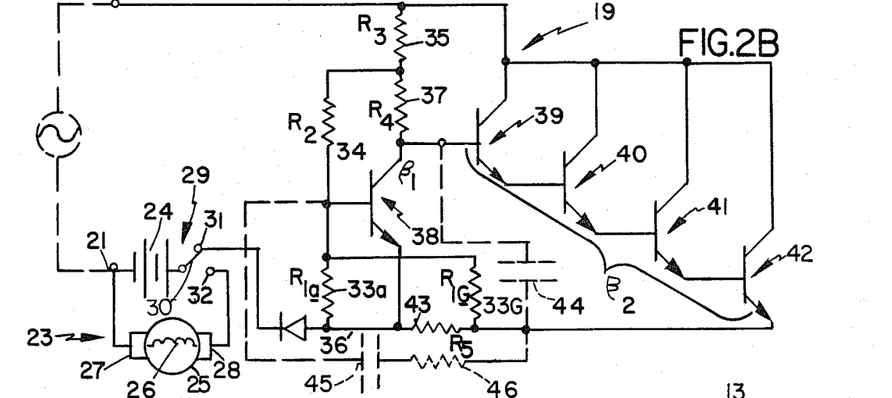
FIG. 2B is a circuit diagram of a variant of the first embodiment of of which current regulating circuit according to the present inventing used in a battery charger and which may be incorporated into the housing of the hand tool illustrated in FIG. 1.
Figure 3A:
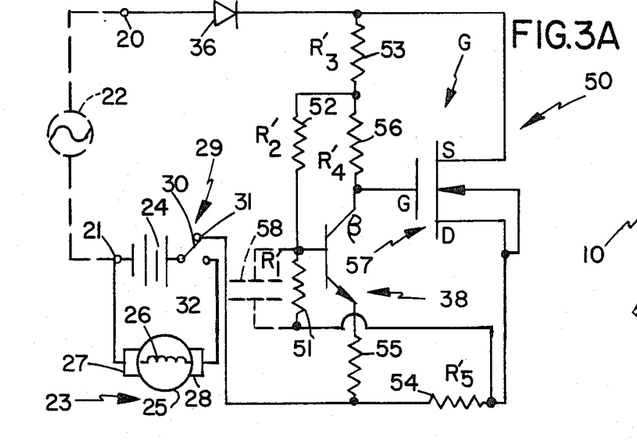
FIG. 3A is a circuit diagram of a second embodiment of a current regulating circuit according to the present invention used in a battery charger and which may be incorporated into the housing of the hand tool shown in FIG. 1 and similar devices.
Figure 3B:
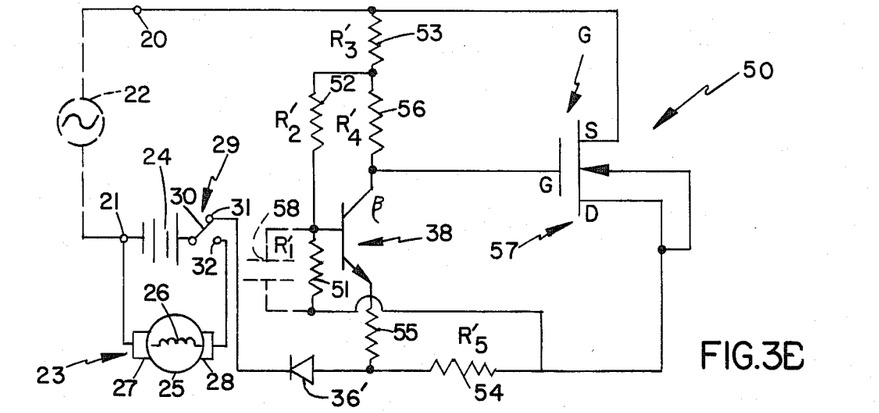
FIG. 3B is a circuit diagram of a variant of the second embodiment of a current regulating circuit according to the present invention used in a battery charger and which may be incorporated into the housing of this hand tool illustrated in FIG. 1.

FIGS. 2A and 3A are respective detailed circuit diagrams of respective embodiments of battery charging circuit constructed according to the present invention and which are readily adapted to be incorporated into the housing 12 of the grass clippers 10 illustrated in FIG. 1, FIGS. 2B and 3B being respective variants of circuits shown respectively in FIGS. 2A and 2B.

As illustrated in FIGS. 2A and 2B, the illustrative, first embodiment of a charging circuit constructed in accordance with the present invention is generally designated by the numeral 19 and includes a pair of terminals 20, 21 which are shown, for purposes of illustration, connected across a conventional, 117 volt 60 Hz voltage source 22. Also shown in FIG. 2A and 2B is an electric motor 23 and a motor-energizing battery 24. The motor 23, may be for example, a small printed magnet electric motor having an armature 25 with inductive windings, shown generally by the numeral 26, to which electrical connections are established by motor brushes 27, 28. The battery 24 may be comprised of four conventional 1.3 volt nickle-cadmium rechargeable battery cells in series to provide a battery voltage of approximately 5.2 volts when fully charged. The battery charging circuit designated generally by the numeral 19 is connectable to the battery 24 by a single-pole, double-throw, manually operated switch 29 having a movable contact 30 for selective engagement with a stationary contact 31 which, when brought into contact with the movable contact 30 as illustrated, places the battery 24 in a recharging position. When the movable contact 30 is moved to engage its associated stationary contact 32, the battery charging circuit 19 is taken out of circuit with the battery 24, which is then in its "operate" position, the battery 24 energizing the motor 24.

The basic charging circuit 19, as illustrated in FIGS. 2A and 2B, can be used to charge, for example, both 2.6 volt and 5.2 volt nickle-cadmium batteries from conventional 117 volt, and 234 volt 60 Hz power sources. It is to be appreciated, however, that the charging circuit illustrated in FIGS. 2A and 2B can be utilized to charge rechargeable batteries of considerably different voltage levels from sources of different levels and/or supply frequencies, the above-mentioned levels and frequencies being set out by way of example only. The battery charging circuit 19 includes, a first resistor 33a (resistance $R_{1a}$) a second resistor 33b (resistance $R_{1b}$), a third resistor 34 (resistance $R_2$), a fourth resistor 35 (resistance $R_3$) and a rectifying diode 36 (FIG. 2A) the rectifying diode 36 having its anode connected to the terminal 20 and its cathode connected to one end of the resistor 35. The difference between the circuit variants illustrated in FIGS. 2A and 2B in that in the variant shown in FIG. 2B the rectifying diode 36 has been replaced by rectifying diode 36' which is connected between the fixed contact 31 of the switch 29 and the emitter of the transistor 38. A fifth resistor 37 (resistance $R_4$) is connected between the connection point of the third resistor 34 and the fourth resistor 35 and the collector of an NPN transistor 38, which has its emitter connected to the stationary contact 31 of a manually operated switch 29 and to one end of the first resistor 33a. The other end of the first resistor 33a is connected to the base of the transistor 38, as well as to one end of the third resistor 34. The transistor 38 and resistors 33a, 33b, 34, 35 and 37 constitute the control stage of the battery charging circuit 19. The collector of the transistor 38 is connected, in turn, to a current amplifier which includes a Darlington connected series of NPN junction transistors 39–42. The Darlington connected transistors are selected so as to provide a relatively high current gain, for example, a current gain ($\beta_2$) of approximately 200,000, while the control stage which includes the transistor 38 is selected to also have a current gain ($\beta_1$), for example, of about 100. The collectors of each of the transistors 39–42 are connected to the cathode of the rectifying diode 36. The base of the first of the transistors 39–42, that is the transistor 39 is connected to the collector of the switching transistor 38. The emitter of the final one of the Darlington-connected transistors 39–42, that is the transistor 42, is connected to the stationary contact 31 of the manually-operated switch 29 and to the emitter of the transistor 38, via a current-limiting sixth resistor 43 ($R_5$). The current-limiting sixth resistor 43 is a positive temperature coefficient (PTC) resistance, formed by metallization from materials which are selected so that this resistor will also function as a fuse, allowing circuit failure without change to the battery undergoing recharging and endangering the surroundings. The battery charging circuit 19, as illustrated in FIGS. 2A and 2B, is provided with external feedback between the output of the current amplifier constituted by the Darlington circuit configured transistors 39–42 and the switching transistor 38 by virtue of the connection of the resistor 33b between the base of the transistor 38 and the circuit point at which the resistor 43 and the emitter of the transistor 42 meet. Internal feedback is provided by the resistor 35 because of its coupling to the base of the transistor 38 via the resistor 34 and the first resistor 33a connected as illustrated. Hereinbelow, the first and second resistors 33a and 33b (resistance $R_{1a}$ and $R_{1b}$) may be considered to be a single resistance (resistance $R_1$) constituted by resistors 33a and 33b connected in parallel.

By way of example only, typical values for circuit parameters of the battery charging circuit illustrated in FIGS. 2A and 2B, which would be used in an exemplary integrated circuit embodiment are:

| | | |
|---|---|---|
| $R_1$ = 8,946 ohms, | $i_a$ = | .12 ampere (average), |
| $R_2$ = 120,543 ohms, | $i_p$ = | 5.0 ampere (peak), |
| $R_3$ = 54,668 ohms, | $\beta_1$ = | 100 (current gain, control stage), |
| $R_4$ = 13,667 ohms, | $\beta_2$ = | 200,000 (current gain, |
| $R_5$ = .385 ohms, | | current amplifier). |

It is to be appreciated that the individual values for the resistances $R_1$–$R_4$ can vary considerably, as a practical matter by about ±20 percent, the exact values for resistances $R_1$–$R_4$ not being nearly as important as the ratios among them. The ratios of $R_1:R_4$, $R_2:R_4$ and $R_3:R_4$, in a practical case, should desirably be within the range of substantially ±5 percent and preferably substantially ±1 percent. These criteria make it possible to realize the charging circuit of FIGS. 2A and 2B as an integrated circuit using diffusion techniques. It is conceived that the integrated circuit, in an exemplary practical realization can be contained within a small housing preferably of cylindrical shape and having a length of about 3/16 inch and a diameter of about 5/36 inch. Two concentric wire leads each of about one inch can be provided to extend from the housing.

Accordingly, expressing the above-mentioned ratios as constants $K_1$, $K_2$ and $K_3$, respectively, we have: $K_1=0.65\pm0.03=R_1/R_4$, $K_2=8.82\pm0.44=R_2/R_4$, and $K_3=4.00\pm0.20=R_3/R_4$; or, as the preferred case is, $K_1=0.65\pm0.006$, $K_2=8.82\pm0.088$ and $K_3=4.00\pm0.04$.

In some instances, a small capacitor 44 may be placed between the collector of the transistor 38 and the emitter of the transistor 42 and/or a series circuit which includes a small capacitor 45 and a resistor 46 may be placed between the base of the transistor 38 and the emitter of the transistor 42 for the purpose of reducing the possibility that the circuit would oscillate, the capacitors 44, 45 and the resistor 46, being shown with their connections as dashed lines to indicate that they need not be present.

The sixth resistance $R_5$ need not be in a particular ratio with respect to the other resistances and can readily be formed by metallization and be constituted by a metal contact to or between circuit points. The resistance $R_5$ is desirably a positive temperature coefficient (PTC) resistance, which increases in value as temperature increases, thus limiting current flow. The size of resistance $R_5$, relative to the sizes of resistances $R_1$–$R_4$, is very small. The resistance $R_5$ acts to stabilize the battery charging circuit which, in a practical case, operates at a temperature of about 125° C. during battery charging when the chip is provided with a suitable thermal mounting. Charging current will decrease with an increase in ambient temperature of approximately forty-five hundredths of one percent (0.45%) per degree Centigrade, roughly matching the desired change in nickle-cadmium cell trickle charging current with temperature.

Figure 4A:
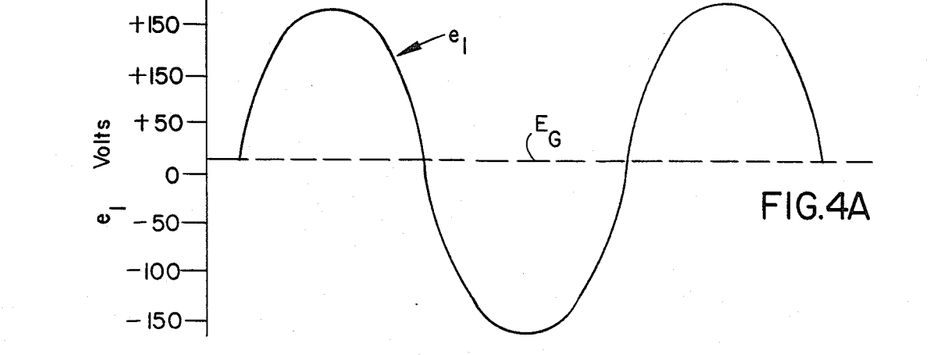
FIGS. 4A–4C are voltage and current waveforms at various locations in the circuits illustrated in FIGS. 2A, 2B, 3A and 3B are helpful in understanding the operation thereof.
Figure 4B:
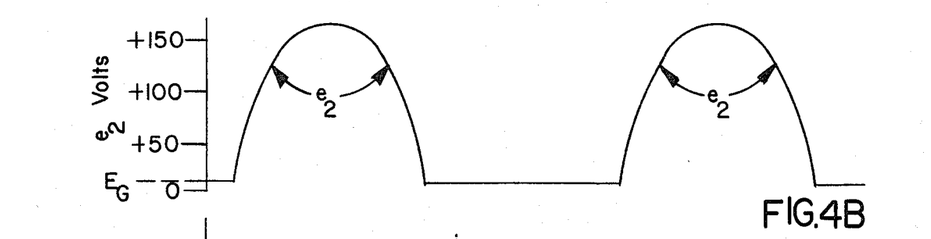
Figure 4C:
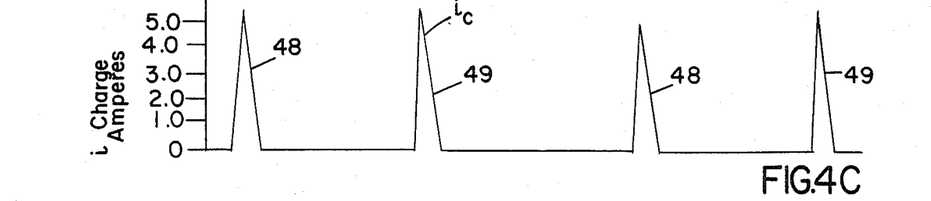

In operation, the circuit arrangements shown in FIGS. 2A and 2B are placed in operation by connecting the charging circuit 19 to the voltage source 22 which is shown as connected between the input terminals 20,21 of the charging circuit 19. The battery 24 to be charged is connected between the terminal 21 and the stationary contact 31 (its voltage being illustrated in FIGS. 4A and 4B as $E_b$), via the movable contact 30, when this manually-operated switch 29 is in the position shown. FIG. 4A shows the voltage waveform $e_1$ as a function of time of the input source voltage 22 for a conventional 117 volt (rms), 60 Hz household outlet supply. FIG. 4B is a waveform $e_2$ of the rectified voltage at the output of the rectifier diode 36. The voltage waveforms as shown in FIGS. 4A and 4B are illustrated for one and one-half cycles of the 60 Hz input. FIG. 4C is a corresponding waveform of the charging current $i_c$, during operation after the stable operating temperature of about 125° C. has been reached, as indicated by the arrow 47 shown in FIGS. 2A and 2B through the sixth resistor 43 and into the positive side of the battery 24. As can be seen in FIG. 4C, there are two current spikes 48, 49 for each cycle of A.C. input, the peak charging current $i_p$ being about 5.0 amperes. These current spikes 48, 49, as can be seen, are relatively short in duration, for example about 0.0004 seconds, resulting in an average charging current $i_c$ of about 0.12 ampere.

Referring again to FIGS. 2A and 2B, the diode 36 or 36', as the cases may be, provides a source of input current for the Darlington configured current amplifier defined by the transistors 39–42, as well as operating voltage for the switching transistor 38 of the control stage. Initially, relatively high current spikes are produced, causing the PTC resistor 43 to increase in value, because of heating thereof; resulting in the current spikes having lesser magnitudes as they approach the 5.0 ampere level and the chip achieves its stable operating temperature of about 125° C. Thereafter, when the A.C. voltage $e_1$ of the source 22 is positive and slightly greater, for example less than 2.6 volts with respect to the battery potential $E_b$ of the battery 24 which is to be recharged, the transistors 38 and 39–42 do not conduct. When the voltage difference reaches about 2.6 volts, battery charging current starts to flow through the transistors 39–42, illustrated as the leading edge of the current spike 48 in FIG. 4C. The current into the base of the transistor 39 in effect is amplified by the transistors 39–42 and initially flows at a relatively low level, through the sixth resistor 43 into the battery thereby starting to charge the battery as the leading edge of the current spike 48 starts toward the 5.0 ampere level. This current, illustrated as current spike 48, can be considered to be increasing as the voltage supplied via the rectifying diode 36 or the diode 36' becomes more positive and reaches its peak of about 5.0 amperes when the line voltage $e_1$ is about 10 volts greater than the battery voltage $E_b$. Increasing current is supplied not only to the Darlington connected transistors 39-42, but also to the base of the transistor 38, via the voltage divider consisting of the first resistor 33a and the second resistor 33b connected in parallel (the resistance of resistor 43 need not be considered because it is very small compared to the resistances of resistors 33a and 33b), the third resistor 34 and the fourth resistor 35, which are connected in series, as pointed out above, between the diode 36 and the stationary contact 31 of the manually-operated switch 29 (FIG. 2A) or between the contact 31 of the switch 29 and the terminal 20 (FIG. 2B). Once the current into the base of the transistor 38 is sufficient, when the line voltage $e_1$ reaches the level of about 10.0 volts greater than the battery voltage $E_b$, to turn this transistor on, considerable current starts to flow through the emitter-collector path thereof, reducing the voltage, and thus the current, supplied to the base of the transistor 39 causing the current amplifier, consisting of the transistors 39-42 connected in Darlington configuration, to exhibit reduced current flow, as illustrated by the trailing edge of the current spike 48 in FIG. 4C and quickly turn off the resulting current spike 48 having a duration of about 0.0004 second. The transistors 39-42 are turned off when the line voltage $e_1$ reaches a difference of about 27.6 volts with respect to battery voltage $E_b$. During this time period, because of the internal feedback provided as a result of the lowering of the voltage, at the point of connection between the third resistor 34 and the fourth resistor 35, the effective resistance of the transistor 38 increases. The transistors 39-42 are again turned on when the difference between the line voltage again reaches as it falls about 27.6 volts with respect to the battery voltage $E_b$ while the transistor 38 is conducting, with the result of the leading edge of the current spike 46 of FIG. 4C is produced, this current spike reaching a peak of about 5.0 amperes when the voltage difference between the voltage $e_1$ and the battery voltage $E_b$ again reaches about 10 volts. The transistors 39-42 remain conducting until the difference between the input voltage $e_1$ and the battery voltage $E_b$ again reaches about 2.6 volts. Thus current spike 46 of about 5.0 amperes and 0.0004 second duration is produced. These actions take place every other half cycle of the input voltage $e_1$ with the result that the two current spikes 48, 49 are produced, one at the starting portion and the other at the ending portion of each of these half cycles. Thus, a charging current spike is produced for a short period of time, for example, of about 0.0004 second as indicated above during an initial portion of the rectified half-wave voltage output $e_2$ from the rectifying diode 36 (FIG. 2A) or diode 36' (FIG. 2B) and another current spike 49 during its terminal portion, the spike 49 also having a duration of about 0.0004 second as indicated above. These actions take place time and time again providing, in effect, a trickle charge in the form of current spikes to the battery 24 which continue until the battery is fully charged.

It is to be appreciated that were a 234 Volt, 60 Hz source used instead of the 117 Volt 60 Hz source (and if the effects of temperature changes within the circuit are ignored), the peak amplitude of current spikes 48, 49 (FIG. 4C) would not change but the time duration of these spikes and the average current would be halved. However, in practice, the operating temperature of the circuit at the higher source voltage would be less than when the source is 117 Volts, thereby decreasing the value of the PTC resistor 43 and increasing the peak amplitude of the current spikes 48, 49. In addition, the lower circuit temperature would increase the base-emitter threshold voltage of transistor 38 (FIGS. 2A and 2B) thereby tending to increase both the duration of the current spikes and the peak amplitudes of the current spikes. As a result of the lowered circuit temperature when the device is operated at higher source voltages, the reduction in average current is considerably less than would be the case if the circuit temperature were to remain constant.

As illustrated in FIGS. 3A and 3B, like reference numerals designating like circuit components as those in FIGS. 2A and 2B, the illustrative, second embodiment and a variant thereof of a charging circuit constructed in accordance with the present invention is generally designated by the numeral 50 and includes a pair of terminals 20, 21 which are shown, for purposes of illustration, connected across a conventional, 117 volt, 60 Hz voltage source 22. Also shown in FIGS. 3A and 3B is an electric motor 23 and a motor-energizing battery 24. The motor 23, may be, for example, a small permanent magnet electric motor having an armature 25 with inductive windings 26 to which electrical connections are established by motor brushes 27, 28. The battery 24 may be comprised of conventional rechargeable battery cells in series. The battery charging circuit designated generally by the numeral 50 is connectable to the battery 24 by a single-pole, double-throw, manually operated switch 29 having a movable contact 30 for selective engagement with a stationary contact 31 which, when brought into contact with the movable contact 30 as illustrated, places the battery 24 in a recharging position. When the movable contact 30 is moved to engage its associated stationary contact 32, the battery charging circuit 50 is taken out of circuit with the battery 24, which is then in its "operate" position, the battery 24 energizing the motor 23.

The basic charging circuit 50, as illustrated in FIGS. 3A and 3B, can be used to charge both 2.6 volt and 5.2 volt nickle-cadmium batteries from 117 volt, 60 Hz power supplies from 234 volt, 60 Hz power supplies. It is to be appreciated, however, that the charging circuit illustrated in FIGS. 3A and 3B can be utilized to charge rechargeable batteries of considerably different voltage levels and itself have different levels and/or supply frequency, the above-mentioned levels and frequency being set out by way of example only. The battery charging circuit 50 includes, a first resistor 51 (resistance $R'_1$) and a second resistor 52 (resistance $R'_2$), a third resistor 53 (resistance $R'_3$) which is included if internal feedback is desired, and a fifth resistor 54 ($R'_5$) in series with a rectifying diode 36 connected between a terminal 20, connected to an A.C. source 22, and one end of the resistor 53 (FIG. 3A) or the rectifying diode may be connected, as illustrated by rectifying diode 36' (FIG. 3B), between a stationary contact 31 of a switch 29 (FIG. 3B), and the resistor 54. A further resistor 55 is connected between the emitter of the transistor 38 and the fixed contact 31 of the switch 29, as shown in FIG. 3A or to anode of the rectifying diode 36', as shown in FIG. 3B. As illustrated, the rectifying diode 36 (FIG. 3A) has its anode connected to the terminal 20 and its cathode connected to one end of the third resistor 53. A fourth resistor 56 (resistance $R'_4$) is connected between the connection of the second resistor 52 and the third resistor 53 and the collector of the NPN transistor 38, which has its emitter connected to the stationary contact 31 of the manually operated switch 29, via the further resistor 55, and, via the fifth resistor 54, to one end of the first resistor 51, which has its other end connected to the base of the transistor 38, as well as to one end of the second resistor 52. The transistor 38 and the resistors 51–56 constitute the control stage of the battery charging circuit 50. In the event the third resistor 53 is not present, the resistance $R_3$ being zero, and the ends of the resistor 52 and the resistor 56 not connected to electrodes of the transistor 38 would be connected directly to the cathode of the diode 36 (FIG. 3A) or to the terminal 20 (FIG. 3B). In this case, only external feedback would be provided. The collector of the transistor 38 is connected, in turn, to the gate electrode (G) of a field-effect-transistor (FET), preferably a metal oxide, silicon field-effect-transistor (MOSFET) 57. The MOSFET 57 and its circuit components are selected so as to provide a relatively high transconductance (G) of approximately 2 mhos, while the transistor 38 of the control stage is selected to also have in circuit a relatively high current gain ($\beta$), for example, a gain of about 100. The collector of the transistor 39 and the source electrode (S) of the MOSFET 57 are connected to the cathode of the rectifying diode 36 (FIG. 3A) or to the terminal 20 (FIG. 3B). The gate electrode (G) of the MOSFET 57 is connected to the collector of the transistor 38. The drain electrode (D) of the MOSFET 57 is connected to the stationary contact 31 of the manually-operated switch 29 (FIG. 3A) or to the anode of the rectifying diode 36 (FIG. 3B) and to the emitter of the control transistor 38, via the fifth resistor 54. The battery charging circuit 50 illustrated in FIGS. 3A and 3B, is provided with external feedback between the output of the amplifier constituted by the MOSFET 57 and the switching transistor 38 via the fifth resistor 54 which has its end not connected to the stationary contact 31 (FIG. 3A) or the anode of the diode 36' (FIG. 3B) connected to that end of the first resistor which is not connected to the base of the transistor 38. Additional internal feedback is provided, as in the embodiment illustrated in FIGS. 2A and 2B, by virtue of the third resistor 53 (resistor 35, FIGS. 2A and 2B) because of its coupling to the base of the transistor 38, as illustrated.

Again, by way of example only, typical values for circuit parameters of the battery charging circuit illustrated in FIGS. 3A and 3B, which could be used in an integrated circuit embodiment are:

| | | |
|---|---|---|
| $R'_1$ = 3,900 ohms, | $i_a$ = | .12 ampere (average), |
| $R'_2$ = 100,000 ohms, | $i_p$ = | 5.0 ampere (peak), |
| $R'_3$ = 18,000 ohms, | $\beta$ = | 100 (current gain, control stage), |
| $R'_4$ = 36,000 ohms, | G = | 2 mhos (transconductance of gain, |
| $R'_5$ = .07 ohms, | | MOSFET amplifier) |
| $R'_6$ = 270 ohms, | | |

As in the embodiment illustrated in FIGS. 2A and 2B, the individual values for the resistances $R'_1$–$R'_4$ can vary considerably, as a practical matter by about ±20 percent, the exact values for resistances $R'_1$–$R'_4$ not being as important as the ratios among them. The ratios of $R'_1$:$R'_4$, $R'_2$:$R'_4$ and $R'_3$: $R_4$, in a practical case should desireably be within the range of substantially ±5 percent and preferably substantially ±1 percent. These criteria make it possible to realize the charging circuits of FIGS. 3A and 3B as an integrated circuits using diffusion techniques, the same dimensional characteristics mentioned in conjunction with the embodiment illustrated in FIGS. 2A and 2B applying equally well to this embodiment. Accordingly, expressing the above-mentioned ratios as constants $K'_1$, $K'_2$ and $K'_3$, respectively, we have $K'_1 = 0.57 \pm 0.03 = R'_1/R'_4$, $K'_2 = 7.69 \pm 0.38 = R'_2/R'_4$, and $K'_3 = 4.00 \pm 0.20 = R'_3/R'_4$; or, as the prefered case is: $K'_1 = 0.57 \pm 0.066$, $K'_2 = 7.69 \pm 0.076$, and $K'_3 = 4.00 \pm 0.04$.

The resistance $R'_5$ need not be in a particular ratio with respect to the other resistances and can easily be formed by metallization and be constituted by a metal contact to or between circuit points. As in the case of FIGS. 2A and 2B, the resistance $R'_5$ is desirably, a positive temperature coefficient (PTC) resistance, which increases in value as the temperature increases, thus limiting the current flow and serving to stabilize the circuit which in a practical integrated circuit version may operate at a chip temperature of about 125° F. during battery charging when the chip is provided with a suitable thermal mounting. The PTC resistor 54 ($R'_5$) is preferably formed by metallization with materials which are selected so that the resistor will also function as a fuse, allowing the circuit to fail without damaging the battery undergoing charging and endangering the surroundings. Charging current will decrease with an increase in ambient temperature of approximately ¼ percent per degree Fahrenheit, roughly matching the desired change in nickle-cadmium cell trickle charging current with temperature.

The resistor 55 which is connected in series with the emitter of the transistor 38 need not be in any particular ratio relationship to the resistances $R'_1$–$R'_4$, its purposes being to provide an appropriate bias.

A 1200 μf capacitor 58 may be connected in parallel with the resistor 51 for the purpose of assuring that the circuit does not oscillate under some operating conditions.

In operation, the circuit arrangements shown in FIGS. 3A and 3B are placed in operation by connecting the charging circuit 50 to the voltage source 22 which is shown as connected between the input terminals 20,21 of the charging circuit 50. The battery 24 to be charged is connected between the terminal 21 and the stationary contact 31, via the movable contact 30, when this manually-operated switch 29 is in the position shown. FIG. 4A shows the voltage waveform $e_1$ as a function of time of the input source voltage 22 for a conventional 117 volt rms, 60 Hz household outlet supply. FIG. 4B is a waveform $e_2$ of rectified voltage at the output of the diode 36 (FIG. 3A). In the event the diode is placed as the diode 36' shown in FIG. 3B, the waveform shown in FIG. 4B would be modified so that opposite half angles of the waveform of FIG. 4B would be rectified. The voltage waveforms as shown in FIGS. 4A and 4B are illustrated for one and one-half cycles of the 60 Hz input. FIG. 4C is a corresponding waveform of the charging current indicated by the arrow 58 shown in FIGS. 3A or 3B, through the fifth resistor 54 and into the positive side of the battery 24 subsequent to the chip reaching its stable operating temperature of about 125° F. and the PCT resistor achieving its stable value in the manner set out above in connection with discussion of the operation of the circuit of FIGS. 2A and 2B. As can be seen in FIG. 4C, there are two current spikes 48, 49 for each cycle of A.C. input. These current spikes, as can be seen, are relatively in short duration.

In one practical version of the circuit, illustrated in FIGS. 3A and 3B, it was found that the current spikes 48, 49 may reach, as illustrated in FIG. 4C, a magnitude of about 5.0 amperes or thereabouts after operating temperature has been reached, so as to provide an average charging current of approximately 0.12 ampere, the current spikes 48, 49 each being of about 0.0004 second duration.

Referring again to FIGS. 3A and 3B, the diode 36 (FIG. 3A) or diode 36′ (FIG. 3B) provides a source of input current for the MOSFET amplifier 57 as well as operating voltage for the transistor 38 of the control stage. When the A.C. voltage source 22 ($e_1$) is positive and slightly greater, for example about 2.6 volts greater than the battery potential $E_b$ of the battery 24 which is to be recharged, the transistor 38 does not conduct, yet current, at this voltage difference, flows through the resistors 53 and 56 to charge the gate electrode of the MOSFET 57. The source current for the MOSFET 57 flows through the fifth resistor 54 into the battery 24 thereby starting to charge the battery as the leading edge of current spike 48 starts toward the 5.0 ampere level. This current can be considered to be increasing as the current supplied via the rectifying diode 36 becomes more positive and reaches its peak of about 5.0 amperes when the line voltage is about 10 volts greater than the voltage $E_b$ of the battery 24 being recharged. The control transistor 38 starts to conduct at this voltage level, its emitter-collector current flowing through the resistors 53, 56 resulting in a reduction of voltage applied to the gate electrode of the MOSFET 57 and, consequently, in a decrease in the charging current $i_c$ as illustrated by the trailing edge of the current spike 48. Increasing current is supplied, as the difference between the battery potential $E_b$ and the voltage $e_1$ source 22 to the base of the transistor 38, via the voltage divider consisting of the fifth resistor 54, the first resistor 51 and the second resistor 52, as well as the third resistor 53 if present, which are connected in series, as pointed out above with the A.C. power supply 22 via either the diode 36 (FIG. 3A) or the diode 36′ (FIG. 3B). Once the current into the base of the transistor 38 is sufficient, which occurs as pointed out when the difference between the line voltage $e_1$ and battery voltage $E_b$ reaches a level about 10.0 volts, to turn this transistor on, considerable current starts to flow through the emitter-collector path. As the voltage difference increase still further, that is toward 27.6 volts, the voltage, and thus the voltage, supplied to the gate of the MOSFET 57 decreases causing the current through this amplifier to be reduced and the MOSFET 57 quickly turned off when the difference reaches 27.6 volts. The control transistor 38 continues to conduct and the MOSFET 57 remain off as the voltage difference between the battery voltage $E_b$ and the line voltage $e_1$ becomes still greater. The charging current reached a peak level of about 5.0 amperes as illustrated by current spike 48 in FIG. 4C, the duration of the current spike 48 being about 0.0004 seconds. This action takes place during an initial portion of the half-wave voltage output from the rectifying diode 36 (FIG. 3A) or diode 36′ (FIG. 3B). As the voltage difference between the line voltage $e_1$ and the battery voltage $E_b$ increases still further and then becomes less, again reaching about 27.6 volts, the MOSFET 57 is again turned on producing the leading edge of current spike 49, which spike is limited to a maximum of about 5.0 amperes, at this point the difference between the line voltage $e_1$ and battery voltage $E_b$ again reaches 10 volts. Later, as the half-wave voltage output from the diode 36 (FIG. 3A) or diode 36′ (FIG. 3B) falls further, the current provided to the gate of the MOSFET 57 falls as well, finally reaching a point where it is insufficient to keep the transistor 38 and the MOSFET 57 in the conductive state. This condition is reached when the difference between the line voltage $e_1$ and the battery voltage $E_b$ again reaches about 2.6 volts. These actions take place time and time again providing a charge in the form of current spikes 48, 49 to the battery 24 and can continue until the battery is fully charged.

In operation, the external feedback provided by the fifth resistor 54 as connected and the internal feedback provided by the third resistor 53 if present as connected can be considered, in effect, to vary the resistance of the control stage and cause the transistor 38 to limit current flow in the MOSFET 57 to periods when relatively low voltages are present and to, in effect, turn the MOSFET 57 off during times higher voltages are present.

It is to be understood that the foregoing description and accompanying figures of drawing have been set out by way of example, not by way of limitation. Numerous other embodiments and variants of the battery charging circuit are possible, without departing from the spirit and scope of the present invention, its scope being defined by the appended claims.

What is claimed is:

1. In a current regulating circuit having rectification means for producing a D.C. voltage and amplification means, a feedback control circuit comprising solid state means having first, second and third terminals, the third terminal constituting a control terminal, a current sensing resistance between the amplification means and the control circuit, a first resistor having one end thereof connected to the first terminal via said current sensing resistance and the other end thereof connected to the control terminal of the solid state means, a second resistor having one end thereof connected to the control terminal, and a third resistor having one end thereof connected to receive the D.C. voltage, the other end of the second resistor being connected to the other end of the third resistor, further including a fourth resistor connected between the second terminal of the solid state means and the other end of the third resistor, and wherein the individual resistance values of the four resistors can vary substantially and are not nearly as important as the ratios between the first, second and third resistors to the fourth resistor, respectively.

2. The combination of claim 1, wherein the amplification means comprises at least one field effect transistor.

3. The combination of claim 1, further including an additional resistor having one end thereof connected to the third terminal and the other end thereof connected to that end of the current sensing resistance remote from the amplification means.

4. In a current regulating circuit having rectification means for producing a D.C. voltage and amplification means, a feedback control circuit comprising solid state means having first, second and third terminals, the third terminal constituting a control terminal, a current sensing resistance between the amplification means and the control circuit, a first resistor having one end thereof connected to the first terminal via said current sensing resistance and the other end thereof connected to the control terminal of the solid state means, a second resistor having one end thereof connected to the control terminal, and a third resistor having one end thereof connected to receive the D.C. voltage, the other end of the second resistor being connected to the other end of the third resistor, and wherein the current sensing resistance is a positive temperature coefficient resistance which increases in value as the temperature increases, thereby limiting the current flow to a load.

5. In a current regulating circuit having rectification means for producing a D.C. voltage and amplification means, a feedback control circuit comprising solid state means having first, second and third terminals, the third terminal constituting a control terminal, a current sensing resistance between the amplification means and the control circuit, a first resistor having one end thereof connected to the first terminal via said current sensing resistance and the other end thereof connected to the control terminal of the solid state means, a second resistor having one end thereof connected to the control terminal, and a third resistor having one end thereof connected to receive the D.C. voltage, the other end of the second resistor being connected to the other end of the third resistor, and wherein the current sensing resistance has a relatively small value and serves as a fuse for fail safe operation of the circuit.

6. In a current regulating circuit having rectification means for producing a D.C. voltage and amplification means, a feedback control circuit comprising solid state means having first, second and third terminals, the third terminal constituting a control terminal, a current sensing resistance between the amplification means and the control circuit, a first resistor having one end thereof connected to the first terminal via said current sensing resistance and the other end thereof connected to the control terminal of the solid state means, a second resistor having one end thereof connected to receive the D.C. voltage and the other end thereof connected to the other end of the second resistor, a fourth resistor having one end thereof connected to the other end of the third resistor and the other end thereof connected to the second terminal of the solid state means, the arrangement being such that the individual resistance values of the four resistors can vary substantially and are not nearly as important as the ratios between the first, second and third resistors to the fourth resistor, respectively, the current sensing resistance being a positive temperature coefficient resistance which increases in value as the temperature increases, thereby limiting the current flow, the current sensing resistance having a relatively small resistance compared to the other resistances of the four resistors, the current sensing resistance acting as a fuse for fail safe operation of the circuit.

7. In a current regulating circuit having rectification means for producing a D.C. voltage and amplification means, a feedback control circuit comprising solid state means having first, second and third terminals, the third terminal constituting a control terminal, a current sensing resistance between the amplification means and the control circuit, a first resistor having one end thereof connected to the first terminal via said current sensing resistance and the other end thereof connected to the control·terminal of the solid state means, a second resistor having one end thereof connected to the control terminal, a third resistor having one end thereof connected to receive the D.C. voltage and the other end thereof connected to the other end of the second resistor, a fourth resistor having one end thereof connected to the other end of the third resistor and the other end thereof connected to the second terminal of the solid state means, the arrangement being such that the individual resistance values of the four resistors can vary substantially and are not nearly as important as the ratios between the first, second and third resistors to the fourth resistor, respectively, the current sensing resistance being a positive temperature coefficient resistance which increases in value as the temperature increases, thereby limiting the current flow, the current sensing resistance having a relatively small resistance compared to the other resistances of the four resistors, the current sensing resistance acting as a fuse for fail safe operation of the circuit, and wherein the current regulating circuit comprises a battery charging circuit, and wherein a load is serially connected and comprises a rechargeable battery.

8. In a current regulating circuit having rectification means for producing a D.C. voltage and amplification means, a feedback control circuit comprising solid state means having first, second and third terminals, the third terminal constituting a control terminal, a current sensing resistance between the amplification means and the control circuit, a first resistor having one end thereof connected to the first terminal via said current sensing resistance and the other end thereof connected to the control terminal of the solid state means, a second resistor having one end thereof connected to the control terminal, a third resistor having one end thereof connected to receive the D.C. voltage and the other end thereof connected to the other end of the second resistor, a fourth resistor having one end thereof connected to the other end of the third resistor and the other end thereof connected to the second terminal of the solid state means, the arrangement being such that the individual resistance values of the four resistors can vary substantially and are not nearly as important as the ratios between the first, second and third resistors to the fourth resistor, respectively, the current sensing resistance being a positive temperature coefficient resistance which increases in value as the temperature increases, thereby limiting the current flow, the current sensing resistance having a relatively small resistance compared to the other resistances of the four resistors, the current sensing resistance acting as a fuse for fail safe operation of the circuit, and wherein the amplification means comprises at least one field effect transistor.

9. In a current regulating circuit having rectification means for producing a D.C. voltage and amplification means, a feedback control circuit comprising solid state means having first, second and third terminals, the third terminal constituting a control terminal, a current sensing resistance between the amplification means and the control circuit, a first resistor having one end thereof connected to the first terminal via said current sensing resistance and the other end thereof connected to the control terminal of the solid state means, a second resistor having one end thereof connected to the control terminal, a third resistor having one end thereof connected to receive the D.C. voltage and the other end thereof connected to the other end of the second resistor, a fourth resistor having one end thereof connected to the other end of the third resistor and the other end thereof connected to the second terminal of the solid state means, the arrangement being such that the individual resistance values of the four resistors can vary substantially and are not nearly as important as the ratios between the first, second and third resistors to the fourth resistor, respectively, the current sensing resistance being a positive temperature coefficient resistance which increases in value as the temperature increases, thereby limiting the current flow, the current sensing resistance having a relatively small resistance compared to the other resistances of the four resistors, the current sensing resistance acting as a fuse for fail safe operation of the circuit, and wherein the solid state means in the control circuit comprises a junction transistor having a collector-emitter path and a base-emitter path, the base-emitter path being connected in parallel with the first resistor and the current sensing resistance, and the collector-emitter path being connected in parallel with the amplification means.

10. In a current regulating circuit having rectification means for producing a D.C. voltage and amplification means, a feedback control circuit comprising solid state means having first, second and third terminals, the third terminal constituting a control terminal, a current sensing resistance between the amplification means and the control circuit, a first resistor having one end thereof connected to the first terminal via said current sensing resistance and the other end thereof connected to the control terminal of the solid state means, a second resistor having one end thereof connected to the control terminal, a third resistor having one end thereof connected to receive the D.C. voltage and the other end thereof connected to the other end of the second resistor, a fourth resistor having one end thereof connected to the other end of the third resistor and the other end thereof connected to the second terminal of the solid state means, the arrangement being such that the individual resistance values of the four resistors can vary substantially and are not nearly as important as the ratios between the first, second and third resistors to the fourth resistor, respectively, the current sensing resistance being a positive temperature coefficient resistance which increases in value as the temperature increases, thereby limiting the current flow, the current sensing resistance having a relatively small resistance compared to the other resistances of the four resistors, the current sensing resistance acting as a fuse for fail safe operation of the circuit, and further including an additional resistor having one end thereof connected to the control terminal and the other end thereof connected to that end of the current sensing resistance remote from the amplification means.

11. In a battery charger comprising terminal means for connection to an electric power source, an electrical charging circuit and means for connecting at least one rechargeable battery in series with said charging circuit across said terminal means; the improvement wherein: said charging circuit comprises a first resistance, a second resistance and a third resistance connected in series in denominated order; rectifying means including at least one diode for producing a D.C. voltage; a first transistor having a collector-emitter path and a base-emitter path, said base-emitter path being connected in parallel with said first resistance; a fourth resistance, said fourth resistance being connected in series with said collector-emitter path and a circuit point between said second resistance and said third resistance; a fifth resistance; and at least one field effect transistor, said field effect transistor being a MOSFET, said first transistor and said field effect transistor having respectively, their collector and gate electrodes conductively connected, and the field effect transistor having its source electrode coupled to a circuit point between said third resistance and the D.C. voltage and its drain electrode connected to one end of fifth resistance.

12. An improved battery charger according to claim 11, wherein said first resistor is connected between base and emitter of said first transistor via said fifth resistance, thereby providing feedback.

13. In a battery charger comprising terminal means for connection to an electric power source, an electrical charging circuit and means for connecting at least one rechargeable battery in series with said charging circuit across said terminal means; the improvement wherein: said charging circuit comprises a first resistance, a second resistance and a third resistance connected in series in denominated order; rectifying means including at least one diode for producing a D.C. voltage; a first transistor having a collector-emitter path and a base-emitter path, said base-emitter path being connected in parallel with said first resistance; a fourth resistance, said fourth resistance being connected in series with said collector-emitter path and a circuit point between said second resistance and said third resistance; a fifth resistance; at least one field effect transistor, said first transistor and said field effect transistor having respectively, their collector and gate electrodes conductively connected, the field effect transistor having its source electrode coupled to a circuit point between said third resistance and the D.C. voltage and its drain electrode connected to one end of said fifth resistance, said first resistance being connected between base and emitter of said first transistor via said fifth resistance, thereby providing feedback; and wherein the ratios of said first resistance ($R'_1$), said second resistance ($R'_2$) said third resistance ($R'_3$) to said fourth resistance ($R'_4$) are defined as follows:
$R'_1 = K'_1 R'_4$
$R'_2 = K'_2 R'_4$
$R'_3 = K'_3 R'_4$;
where $K'_1 = 0.57 \pm 0.03$, $K'_2 = 7.69 \pm 0.38$ and, $K'_3 = 4.00 \pm 20$.

14. An improved battery charger according to claim 13, where:
$K'_1 = 0.57 \pm 0.006$, $K'_2 = 7.69 \pm 0.076$ and, $K'_3 = 4.00 \pm 0.04$.

15. In a battery charger comprising terminal means for connection to an electric power source, an electrical charging circuit and means for connecting at least one rechargeable battery in series with said charging circuit across said terminal means; the improvement wherein: said charging circuit comprises a first resistance, a second resistance and a third resistance connected in series in denominated order; rectifying means including at least one diode for producing a D.C. voltage; a first transistor having a collector-emitter path and a base-emitter path, said base-emitter path being connected in parallel with said first resistance; a fourth resistance, said fourth resistance being connected in series with said collector-emitter path and a circuit point between said second resistance and said third resistance; a fifth resistance; and at least one field effect transistor, said field effect transistor being a MOSFET, said first transistor and said field effect transistor having respectively, their collector and gate electrodes conductively connected, and the field effect transistor having its source electrode coupled to a circuit point between said third resistance and the D.C. voltage and its drain electrode connected to one end of said fifth resistance, and wherein the values of said resistances can vary by approximately plus or minus 20 percent, and wherein the ratios of the first, second and third resistances to the fourth resistance, respectively, are within the range of approximately plus or minus 5 percent.

16. In a battery charger comprising terminal means for onnection to an electric power source, an electrical charging circuit and means for connecting at least one rechargeable battery in series with said charging circuit across said terminal means; the improvement wherein: said charging circuit comprises a first resistance, a second resistance and a third resistance connected in series in denominated order; rectifying means including at least one diode for producing a D.C. voltage; a first transistor having a collector-emitter path and a base-emitter path, said base-emitter path being connected in parallel with said first resistance; a fourth resistance, said fourth resistance being connected in series with said collector-emitter path and a circuit point between said second resistance and said third resistance; a fifth resistance; and at least one field effect transistor, said first transistor and said field effect transistor having respectively, their collector and gate electrodes conductively connected, and the field effect transistor having its source electrode coupled to a circuit point between said third resistance and the D.C. voltage and its drain electrode connected to one end of fifth resistance, and wherein the values of said resistances can vary by approximately plus or minus 20 percent, and wherein the ratios of the first, second and third resistances to the fourth resistance, respectively, are within the range of approximately plus or minus 5 percent.

17. In a battery charger comprising terminal means for connection to an electric power source, an electrical charging circuit and means for connecting at least one rechargeable battery in series with said charging circuit across said terminal means; the improvement wherein: said charging circuit comprises a first resistance, a second resistance and a third resistance connected in series in denominated order; rectifying means including at least one diode for producing a D.C. voltage; a first transistor having a collector-emitter path and a base-emitter path, said base-emitter path being connected in parallel with said first resistance; a fourth resistance, said fourth resistance being connected in series with said collector-emitter path and a circuit point between said second resistance and said third resistance; a fifth resistance; and at least one field effect transistor, said first transistor and said field effect transistor having respectively, their collector and gate electrodes conductively connected, and the field effect transistor having its source electrode coupled to a circuit point between said third resistance and the D.C. voltage and its drain electrode connected to one end of said fifth resistance, wherein the values of said resistances can vary by approximately plus or minus 20 percent, and wherein the ratios of the first, second and third resistance to the fourth resistance, respectively, are within the range of approximately plus or minus 5 percent, and wherein the fifth resistance comprises a positive temperature coefficient resistance which increases in value as the temperature increases, thereby limiting the current flow.

18. In a battery charger comprising terminal means for connection to an electric power source, an electrical charging circuit and means for connecting at least one rechargeable battery in series with said charging circuit across said terminal means, the improvement wherein: said charging circuit comprise a first resistance defined substantially by a given resistor and another resistor connected in parallel, a second resistance and a third resistance connected in series in the denominated order, rectifying means including at least one diode for producing D.C. voltage, a first transistor having a collector-emitter path and a base-emitter path, said base-emitter path being connected in parallel with said given resistor, a fourth resistance, said fourth resistance being connected in series with said collector-emitter path and a circuit point between said second resistance and said third resistance, a plurality of additional transistors connected in a Darlington configuration and including a second transistor and a final transistor, said first transistor and said second transistor having their respective collector and base conductively connected, and each of said additional transistors having its collector coupled to a circuit point to receive the D.C. voltage, and a fifth resistance, said first transistor and said last transistor having their emitters connected via said fifth resistance, said another resistor and said fifth resistance being connected in series with one another, this series combination being connected in parallel with said base-emitter path, and wherein the respective individual values of said first, second, third and fourth resistances can vary substantially and are not nearly as important as the ratios between said first, second and third resistances to said fourth resistance, respectively, and wherein said fifth resistance is very small compared to said other resistances, and wherein the ratios of said first resistance ($R_1$), said second resistance ($R_2$), said third resistance ($R_3$) to said fourth resistance ($R_4$) are defined as follows:
$R_1 = K_1 R_4$
$R_2 = K_2 R_4$
$R_3 = K_3 R_4$;
where $K_1 = 0.65 \pm 0.03$, $K_2 = 8.82 \pm 0.44$ and, $K_3 = 4.00 \pm 0.20$.

19. An improved battery charger according to claim 18, where:
$K_1 = 0.65 \pm 0.006$, $K_2 = 8.82 \pm 0.088$ and, $K_3 = 4.00 \pm 0.04$.

20. In a battery charger having terminal means for connection to an electric power source, an electrical charging circuit and means for connecting at least one rechargeable battery in series with said charging circuit across said terminal means; the improvement wherein: said charging circuit comprises a first resistance, a second resistance and a third resistance connected in series in denominated order; rectifying means including a diode for producing D.C. voltage; a control transistor having a collector-emitter path and a base-emitter path, said base-emitter path being connected in parallel with said first resistance; a fourth resistance, said fourth resistance being connected in series with said collector-emitter path and a circuit point between said second resistance and said third resistance; means having a control electrode and controllable charging current carrying electrodes, said charging current carrying electrodes being connectable in series with said diode, said control transistor having its collector coupled to said control electrode; and a fifth resistance, said emitter of said control transistor and one of said charging current carrying electrodes being connected via said fifth resistance, wherein said first resistance is connected between base and emitter of said control transistor via said fifth resistance, thereby providing feedback, and wherein the ratios of said first resistance ($R'_1$), said second resistance ($R'_2$) and said third resistance ($R'_3$) to said fourth resistance ($R'_4$) are defined as follows:

$R'_1 = K'_1 R'_4$
$R'_2 = K'_2 R'_4$
$R'_3 = K'_3 R'_4$;

where $K'_1 = 0.57 \pm 0.03$, $K'_2 = 7.69 \pm 0.38$ and, $K'_3 = 4.00 \pm 0.20$.

21. An improved battery charger according to claim 20, where:
$K'_1 = 0.57 \pm 0.006$, $K'_2 = 7.69 \pm 0.076$ and, $K'_3 = 4.00 \pm 0.20$.

* * * * *